US012564129B2

(12) United States Patent
Lee et al.

(10) Patent No.: US 12,564,129 B2
(45) Date of Patent: Mar. 3, 2026

(54) METHOD FOR CONTROLLING SYSTEM COMPRISING LAWN MOWER ROBOT

(71) Applicant: LG ELECTRONICS INC., Seoul (KR)

(72) Inventors: Dongeun Lee, Seoul (KR); Hyeongil Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 623 days.

(21) Appl. No.: 18/010,902

(22) PCT Filed: Nov. 11, 2020

(86) PCT No.: PCT/KR2020/015750
§ 371 (c)(1),
(2) Date: Dec. 16, 2022

(87) PCT Pub. No.: WO2021/256625
PCT Pub. Date: Dec. 23, 2021

(65) Prior Publication Data
US 2023/0232736 A1 Jul. 27, 2023

(30) Foreign Application Priority Data
Jun. 16, 2020 (KR) ........................ 10-2020-0072931

(51) Int. Cl.
*A01D 34/00* (2006.01)
*A01D 101/00* (2006.01)
*G05D 1/00* (2024.01)

(52) U.S. Cl.
CPC ......... *A01D 34/008* (2013.01); *G05D 1/0274* (2013.01); *A01D 2101/00* (2013.01)

(58) Field of Classification Search
CPC .. A01D 34/008; A01D 2101/00; A01D 34/00; G05D 1/0274; G05D 1/0221;
(Continued)

(56) References Cited

U.S. PATENT DOCUMENTS 5,995,884 A * 11/1999 Allen ................... G05D 1/0225
701/25
9,149,170 B2 * 10/2015 Ozick ..................... A47L 11/40
(Continued)

FOREIGN PATENT DOCUMENTS

KR 10-2013-0015456 2/2013
KR 10-2014-0087486 7/2014
(Continued)

OTHER PUBLICATIONS

International Search Report dated Feb. 25, 2021 issued in Application No. PCT/KR2020/015750.
(Continued)

*Primary Examiner* — Wade Miles
*Assistant Examiner* — James Brian Chin
(74) *Attorney, Agent, or Firm* — KED & ASSOCIATES, LLP

(57) ABSTRACT

A method comprises: a lawn mower robot driving to set a boundary of a target work area in which at least three anchors are installed on the boundary; the lawn mower robot receiving a signal from the anchors and setting, as a shadow area, an area where the signal cuts off; the lawn mower robot returning to an initial position and storing driving information received from the anchors transmitting, to a simulator, the driving information and information on the shadow area and the target work area; generating, by the simulator, an obstacle map based on the shadow area of each anchor; the simulator overlapping an externally provided map and the obstacle map, and outputting the same on a screen; and recommending, to a user, positions at which the size of the shadow areas identified within the target work area can be minimized.

14 Claims, 7 Drawing Sheets

(58) Field of Classification Search
    CPC . G05D 1/0234; B25J 9/16; B25J 11/00; B25J
              9/1671; B25J 9/1664; B25J 9/1692; B25J
                                    9/1694; B25J 11/008
    See application file for complete search history.

(56)                    References Cited

U.S. PATENT DOCUMENTS

| | | | | |
|---|---|---|---|---|
| 11,400,595 | B2 * | 8/2022 | Williams | ............... G05D 1/024 |
| 2015/0328775 | A1 * | 11/2015 | Shamlian | ............... B60L 53/68 |
| | | | | 901/1 |
| 2016/0100522 | A1 * | 4/2016 | Yamauchi | ............ G05D 1/0219 |
| | | | | 701/25 |
| 2019/0163175 | A1 * | 5/2019 | Ko | ......................... G05D 1/028 |
| 2020/0037498 | A1 * | 2/2020 | Ko | ......................... G06Q 30/02 |
| 2021/0064043 | A1 * | 3/2021 | Kulkarni | ................ G05D 1/028 |
| 2023/0232736 | A1 * | 7/2023 | Lee | ............................ B25J 9/16 |
| | | | | 56/10.2 A |

FOREIGN PATENT DOCUMENTS

| | | |
|---|---|---|
| KR | 10-2019-0064253 | 6/2019 |
| KR | 10-2020-0018198 | 2/2020 |

OTHER PUBLICATIONS

Korean Notice of Allowance dated Jan. 24, 2022 issued in Application No. 10-2020-0072931.

* cited by examiner

【FIG. 1】
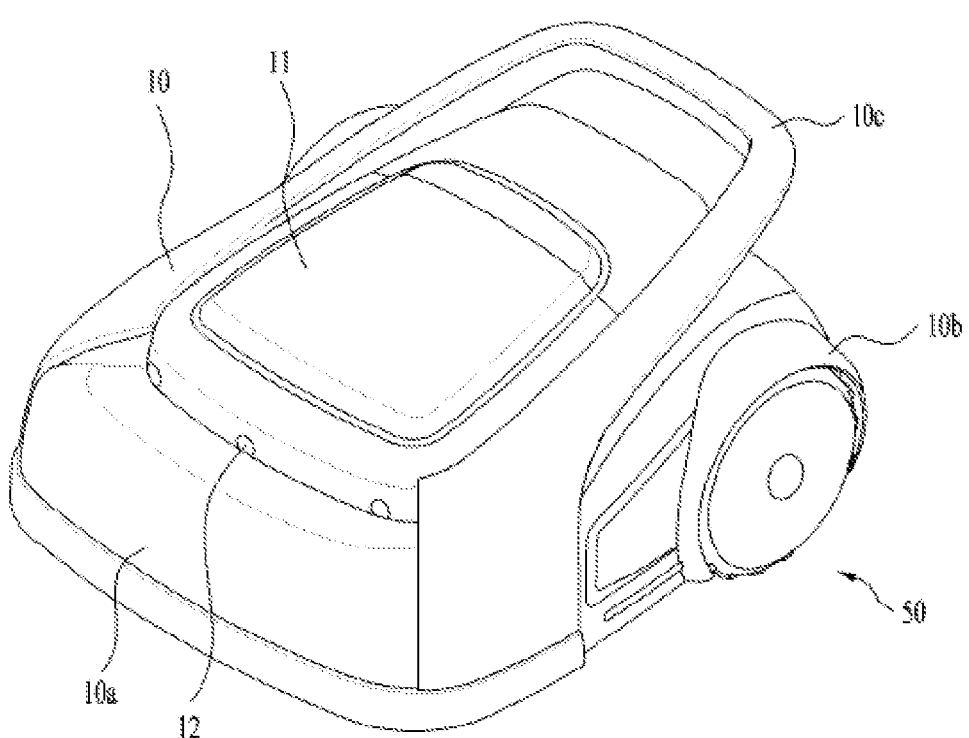

【FIG. 2】
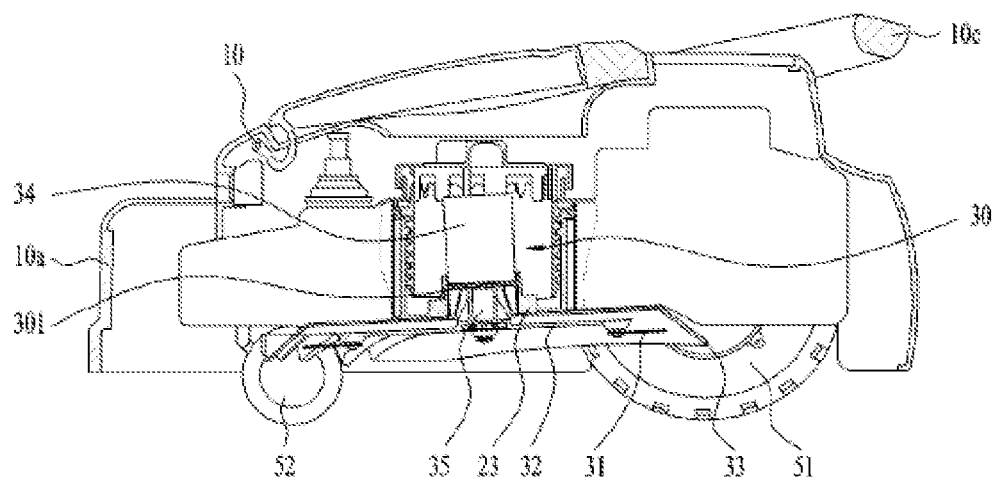
【FIG. 3】
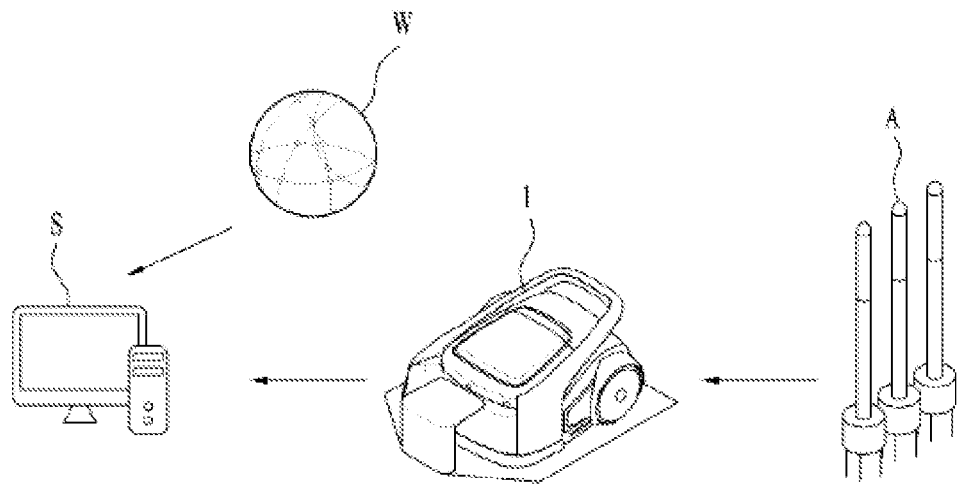

【FIG. 4】
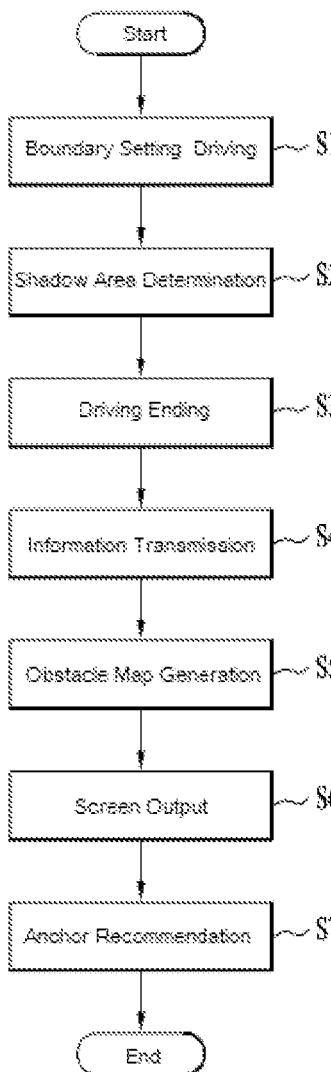

【FIG. 5】
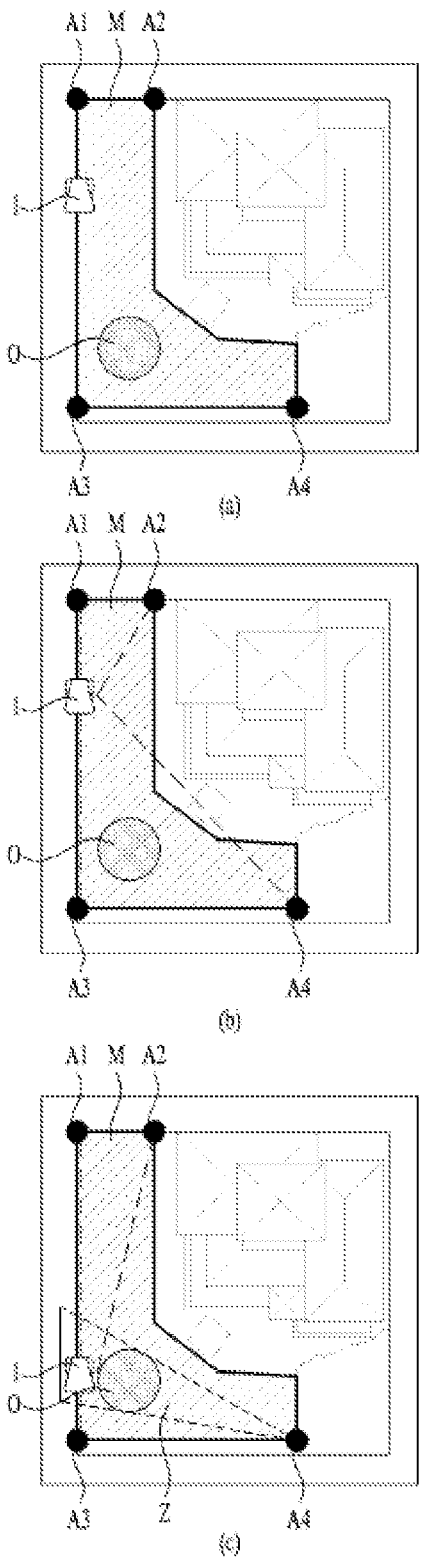

【FIG. 6】
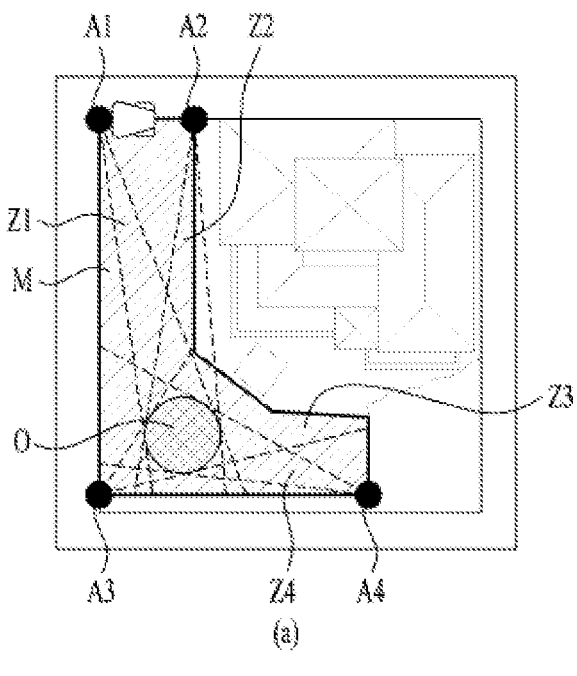
(a)
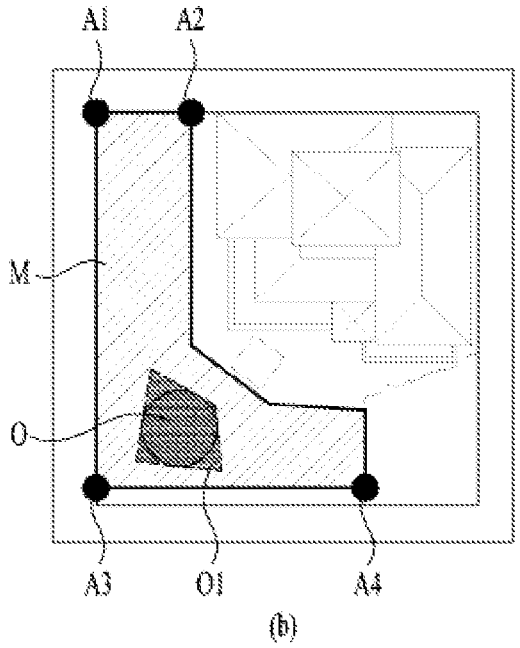
(b)

【FIG. 7】
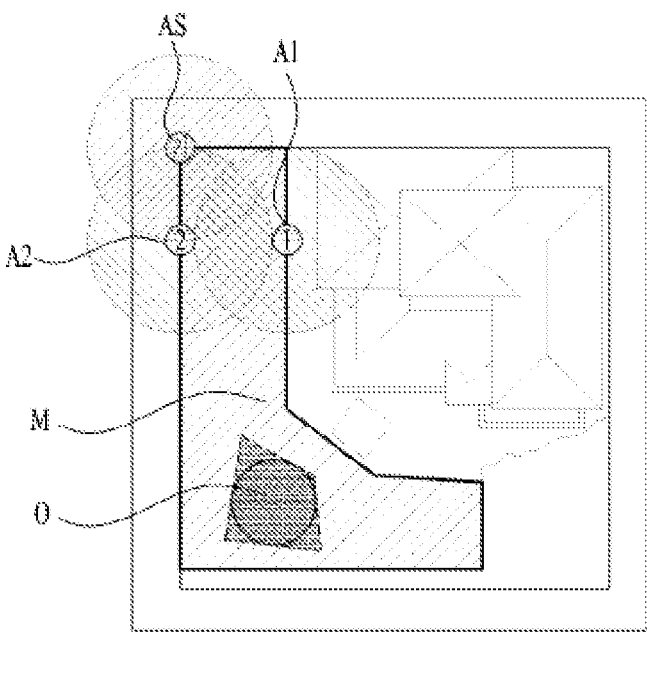
(a)
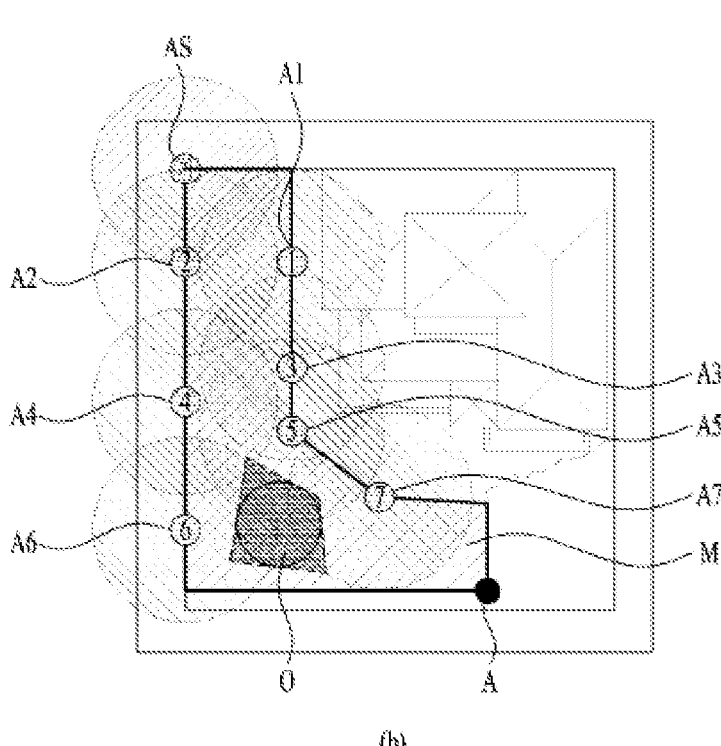
(b)

【FIG. 8】
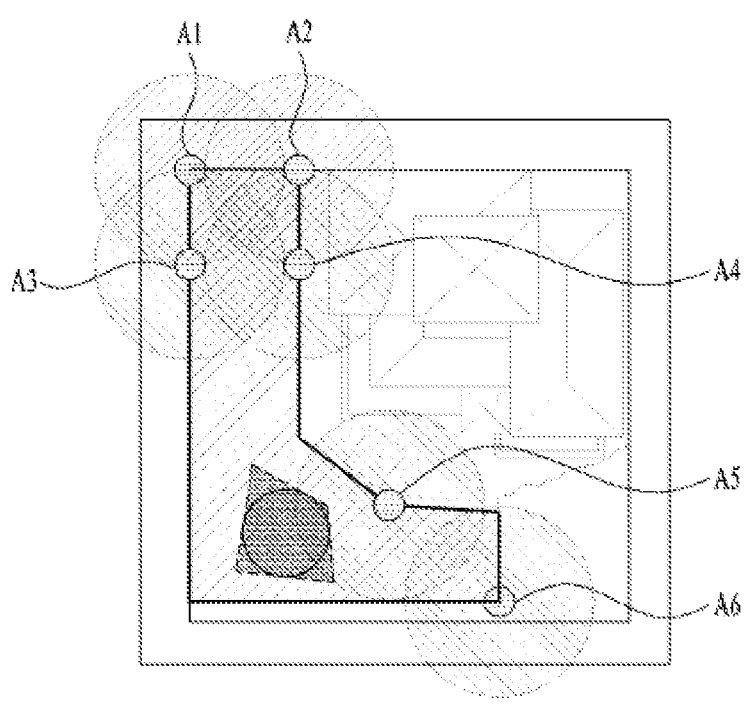
(a)
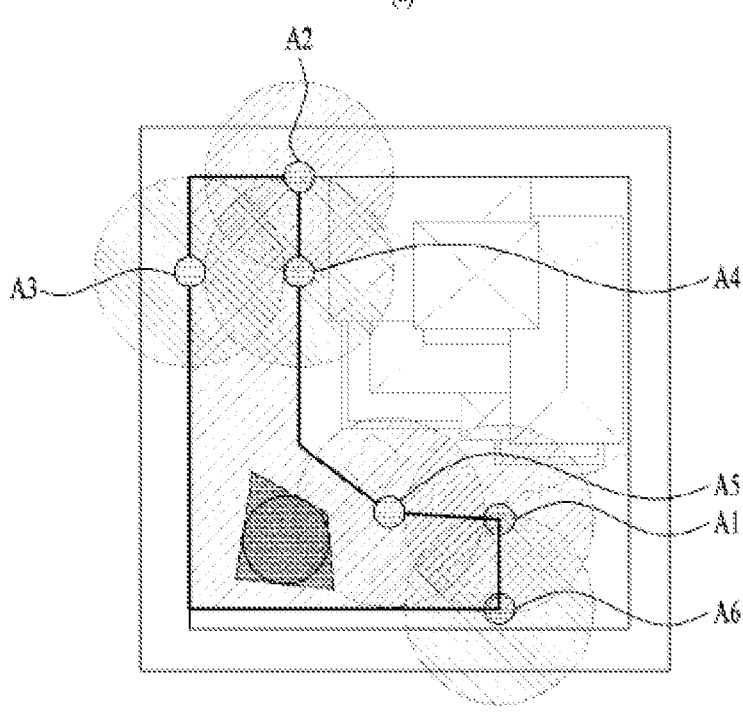
(b)

METHOD FOR CONTROLLING SYSTEM COMPRISING LAWN MOWER ROBOT

CROSS-REFERENCE TO RELATED PATENT APPLICATIONS

This application is a U.S. National Stage Application under 35 U.S.C. § 371 of PCT Application No. PCT/KR2020/015750, filed Nov. 11, 2020, which claims priority to Korean Patent Application No. 10-2020-0072931, filed Jun. 16, 2020, whose entire disclosures are hereby incorporated by reference.

TECHNICAL FIELD

The present disclosure relates to a control method for a system including a lawn mower robot.

BACKGROUND ART

Robots have been developed for industrial use and have been in charge of a part of factory automation. In recent years, the fields of application of robots have been further expanded. Thus, medical robots, aerospace robots, and the like have been developed, and household robots that may be used at home are also being manufactured. Among such robots, those capable of autonomously moving are called mobile robots. A typical example of the mobile robot used in a household outdoor environment is a lawn mower robot.

A lawn mower is a device intended to trim grass planted in a home yard or playground. Lawn mowers are classified into household lawn mowers for household use and tractor-type lawn mowers used in large playgrounds or large farms.

In today's busy daily life, it is difficult for a user to directly operate a lawn mower to mow the lawn in the yard. In most cases, a worker is hired to mow the lawn, which incurs hiring costs.

Therefore, an automatic robot-type lawn mower is being developed to prevent the occurrence of such additional costs and reduce the user's trouble. Various studies have been conducted to control such an automatic robot-type lawn mower to be positioned within a desired area.

To automatically mow the lawn in a place such as a garden, it is important to input accurate information about an area to be mowed.

Patent Document 1 discloses a mapping method for a lawn mower robot, but does not specifically disclose how to process obstacle information.

DISCLOSURE

Technical Problem

According to an embodiment, when an obstacle is present between an anchor and a lawn mower robot communicating with the anchor, a signal disconnection occurs. An object of the present disclosure is to provide a control method for checking whether a user has appropriately selected an installation position for the anchor.

Another object of the present disclosure is to provide a control method for easily identifying an area in which signals are not expected to be received from anchors.

Another object of the present disclosure is to provide a control method for identifying a covered area of the installed anchors and proposing reinstallation to the user when the shadow area is wide.

Another object of the present disclosure is to provide a control method for proposing additional installation when the number of anchors is insufficient.

Technical Solution

The object of the present disclosure may be achieved by providing a control method for a system including an anchor emitting a signal, a robot configured to perform lawn mowing, and a simulator capable of identifying an obstacle based on information collected from the anchor.

Specifically, a control method for a system capable of producing a shadow map by combining maps obtained when the boundary driving of the lawn mower robot is finished is provided.

In addition, a control method for a system capable of deriving expected locations of obstacles and mowing location through shadow map analysis is provided.

Provided herein is a method of controlling a system including a lawn mower robot, the method including boundary setting driving of driving the lawn mower robot to set a boundary of a task target area having at least three anchors installed on the boundary, the boundary setting driving including shadow area determination of receiving, by the lawn mower robot, signals from the anchors and determining an area where the signals are disconnected as a shadow area, driving ending of ending the boundary setting driving and storing driving information received from the anchors when the lawn mower robot returns to an initial position, information transmission of transmitting the driving information and information about the shadow area and the task target area to a simulator, obstacle map generation of generating, by the simulator, an obstacle map based on the shadow area of each of the anchors, screen output of overlapping a map provided from an outside and the obstacle map and outputting the maps to a screen, and anchor recommendation of recommending to a user a location for minimizing a size of the determined shadow area in the task target area.

In an embodiment, the boundary setting driving may include sequentially tracking the anchors and generating a map of the task target area.

In an embodiment, the driving information may include a distance from each of the anchors, signal strengths, and coordinates.

In an embodiment, the shadow area determination may include individually setting the shadow area at each of the anchors.

In an embodiment, the obstacle map generation may include classifying an area having two or more overlapping ones of a plurality of shadow areas as a communication shadow area and an area having three or more overlapping ones of the shadow areas as an obstacle area.

In an embodiment, the screen output may include providing the shadow areas to a user and allowing the user to select the obstacle area or the communication shadow area among the shadow areas based on the map provided from the outside and the obstacle map.

In an embodiment, the anchor recommendation may include taking one of the anchors as a reference anchor and recommending installation locations of the other anchors to the user based on the reference anchor.

In an embodiment, the reference anchor may be selected as one of an anchor having a largest coverage area within the task target area, an anchor having a limited installation space, and an anchor arbitrarily selected by the user.

In an embodiment, based on the reference anchor being selected, an area overlapping a coverage area of the reference anchor may be maintained to be greater than or equal to a predetermined size, and an installation location of an n-th anchor is recommended at a position having a largest coverage area within the task target area, wherein, based on the installation location of the n-th anchor being determined, an installation location of an n+1-th anchor may be recommended to include an area overlapping the reference anchor and the n-th anchor, where n is a natural number greater than or equal to 1.

In an embodiment, the installation location of the n+1-th anchor may be recommended as a position including the area overlapping the reference anchor and the n-th anchor, wherein a coverage area within the task target area may be maximized at the position.

In an embodiment, based on the installation locations of the reference anchor and the n-th anchor being selected, an installation location of the n+2-th anchor may be recommended based on the n-th anchor set as a reference.

In an embodiment, based on installation locations of all the anchors being determined, installing an additional anchor may be recommended so as to cover an area not covered by the installation locations of the anchors in the task target area.

In an embodiment, the method may further include, based on four or more coverage areas of the anchors overlap each other, extracting four anchors among the anchors as a candidate group, and comparing, on the map, the coverage areas of the remaining anchors in the candidate group excluding one anchor, and selecting and moving one anchor making the coverage areas of the remaining anchors maximized.

In an embodiment, a new installation location for the one anchor may be recommended on a boundary of the task target area, wherein the new installation location may be recommended in a zone having a widest area of three or more parts overlapping the coverage areas of the remaining anchors.

In an embodiment, an anchor having a smallest coverage area within the task target area may be selected as the one anchor.

Advantageous Effects

According to the embodiments, a user may easily determine whether the installation position of an anchor is desirable.

In addition, the user may easily modify the map obtained from the anchors and the lawn mower robot by comparing the obtained map with an actual map provided from the outside.

In addition, the position of an obstacle may be predicted based on an identified shadow area.

DESCRIPTION OF DRAWINGS

FIG. 1 is a perspective view of a lawn mower robot according to an embodiment;

FIG. 2 is a cross-sectional view of the lawn mower robot according to the embodiment;

FIG. 3 is a diagram illustrating a relationship in a system including a lawn mower robot according to an embodiment;

FIG. 4 illustrates a control method for the lawn mower robot according to the embodiment;

FIG. 5 (*a*) to (*c*) illustrates boundary setting driving and shadow area determination included in the control method for the system including the lawn mower robot according to the embodiment;

FIG. 6 (*a*) and (*b*) illustrates obstacle map generation included in the control method for the system including the lawn mower according to the embodiment;

FIG. 7 (*a*) and (*b*) illustrates recommendation of anchor installation locations included in the control method for the system including the lawn mower robot according to the embodiment; and FIG. 8 (*a*) and (*b*) illustrates a control method for a system including a lawn mower robot according to another embodiment.

BEST MODE

Reference will now be made in detail to embodiments of the present disclosure, examples of which are illustrated in the accompanying drawings. The detailed description given below is intended to provide a comprehensive understanding of the methods, devices and/or systems described herein. However, the following detailed description is merely an example and the present disclosure is not limited thereto.

In describing the embodiments of the present disclosure, a detailed description of known technology of the related art will be omitted to avoid obscuring the subject matter of the present disclosure. Terms which will be used below are defined in consideration of the functions of the corresponding elements in the present disclosure. The definitions of the terms may vary depending on intention of a user or an operator, customs, or the like. Therefore, the terms should be defined based on the disclosure throughout the specification. The terminology used in the detailed description is merely intended to describe embodiments of the disclosure and should not be construed as limiting. The singular forms include plural referents unless context clearly dictates otherwise. In this specification, terms such as "includes" or "has" are intended to indicate existence of characteristics, figures, steps, operations, constituents, components, parts thereof, or combinations thereof disclosed in the specification. The terms "includes" or "has" should be understood as not precluding existence or possibility of one or more other characteristics, figures, steps, operations, constituents, components, parts thereof, or combinations thereof.

FIG. 1 is a perspective view of a lawn mower robot according to an embodiment, and FIG. 2 is a cross-sectional view of the lawn mower robot according to the embodiment.

Hereinafter, the structure of the lawn mower robot will be described with reference to FIGS. 1 and 2. The description of some parts of the structure of the lawn mower robot according to the present embodiment may be omitted for clear understanding of the disclosure and simplicity. That is, FIGS. 1 and 2 are merely illustrative of the present embodiment, and do not exclude configurations not described herein. Components other than the components described herein may be included at a level that is easy for those skilled in the art.

The lawn mower robot may include an outer cover 10 and an inner body 20.

The outer cover 10 is configured to cover the outside of the inner body 20 and defines the exterior of the robot. A blade 31 to rotate at high speed is mounted inside the outer cover 10. The outer cover 10 is a structure preventing a person's hands or feet from approaching the inside thereof such to protect the hands or feet from an impact caused by the rotation of the blade 31. The lower end of the outer cover 10 should be disposed to be spaced apart from the ground by a predetermined height according to safety standards.

If the lower end of the outer cover 10 is disposed excessively high from the ground, a person's hands or feet from the outside may reach the inside and suffer fatal injuries. If the lower end is disposed excessively low from the ground, the load may increase during mowing of the lawn.

The outer cover 10 may include a display module (not shown) and an input unit (not shown). The display module and the input unit may be provided on the outside of the outer cover 10. However, embodiments are not limited to this example. The display module and the input unit may be covered by an opening/closing part 11 as shown in FIG. 1.

For example, the opening/closing part 11 may be hinged to the outer cover 10. Accordingly, the opening/closing part 11 may remain closed at normal times to cover the display module and the input unit. The opening/closing part 11 may be opened to use the display module and the input unit.

Accordingly, when the lawn mower robot 1 moves, unintended operation thereof that may be caused by unexpected operation of the display module or the input unit by obstacles or external shocks may be prevented.

The outer cover 10 includes a front bumper 10a capable of colliding with an obstacle present ahead, and a fender 10b defining a constant curved surface on both sides of the rear portion of the cover to allow the driving part 50 to be mounted therein. The bumper 10a surrounds the front end portion and the front side portion of the outer cover 10 and is thicker than the other parts. The fender 10b is configured to surround the outer surface of the driving part 50 and has a greater width than the other parts.

The bumper 10a may be formed by connecting a front surface and left and right side surfaces to each other. The front and side surfaces of the bumper 10a are connected in a round shape.

A sensor 12 may be provided in the front of the outer cover 10. The sensor 12 is configured to detect an obstacle in front and may reduce the driving speed of the driving unit 50.

A handle portion 10c may be provided on the upper portion of the outer cover 10. Both sides of the handle portion 10c may be formed to be inclined upward from the front upper portion of the side surfaces of the outer cover 10 to the rear, and the rear end of the handle portion may protrude from the upper rear portion of the outer cover 10 to form a closed curve.

For example, the handle portion 10c may be formed in a "U" shape as shown in the figure. When the handle portion 10c configured in this structure is lifted by hand to carry the lawn mower robot, the blade 31 located on the bottom of the inner body 20 is positioned to face away from the user for the user's safety.

However, embodiments are not limited thereto, and handle portion 10c may be formed in various shapes.

The outer cover 10 is disposed such that the front and rear surfaces and left and right side surfaces thereof are spaced apart from the inner body 20. It is mounted on the top of the inner body 20 so as to be movable in any direction in the event of collision with an obstacle to prevent impact from the obstacle.

The inner body 20 defines an inner space. The lawn mower robot 1 includes a driving unit 50 configured to move the inner body 20 on a driving surface. The driving unit 50 may include a front wheel part 52 and a rear wheel part 51.

The inner body 20 is supported by the front wheel part 52 and the rear wheel part 51.

The front wheel part 52 and the rear wheel part 51 may each be provided as a pair. However, embodiments are not limited thereto. As the size of the lawn mower robot increases, three or more wheels may support the lawn mower robot 1 to support the load.

However, for simplicity, it is assumed that the wheel part is provided with a pair of wheels.

Each of the wheels provided on both sides of the rear wheel part 51 is configured to rotate independently of the other one. In detail, the wheels are configured to rotate independently of each other to allow the inner body 20 to rotate and move forward with respect to the ground.

For example, when the wheels provided to the rear wheel part 51 rotate at the same rotational speed, the lawn mower robot 1 may make a rectilinear movement. When they rotate at different speeds, the lawn mower robot 1 may turn.

The rear wheel part 51 may be formed larger than the front wheel part 52. Since power is transmitted by the rear wheel part 51, it is formed larger than the front wheel part 52. However, embodiments are not limited thereto, and separate power may be provided to the front wheel part 52 to operate in the a four-wheel drive manner.

The lawn mower robot 1 includes a task executer 30 configured to perform a predetermined task. The task executer 30 may include a blade 31, a rotating plate 32, a motor 34, a power transmitter 35, and a protective cover 33.

The blade 31 is very important in improving the grass cutting quality. The blade 31 according to the present disclosure may be formed in a rectangular plate shape having a long length, a narrow width, and a constant thickness. The blade 31 has a constant width along the longitudinal direction. Since the width of the blade 31 is constant and thus the strength of the blade 31 is uniform along the longitudinal direction, durability may be improved.

The protective cover 33 may be configured to protect a user's hands from the blade 31.

The protective cover 33 may extend radially from an upper side of the circumferential surface of the rotating plate 32 to an upper side of the blade 31.

The rotating plate 32 is a component to which a plurality of blades 31 is mounted such that the blades 31 rotate. The rotating plate 32 is rotatably mounted on the bottom surface of the inner body 20. A driving motor to rotate the rotating plate 32 is provided inside the inner body 20. The motor 34 may be connected to the center of the rotating plate 32 via a rotation is shaft 301 to rotate the rotating plate 32.

An accommodation portion 23 may be formed at the center of the inner body 20 to support the blade 31 and the motor 34 and accommodate the power transmitter 35.

The rotating plate 32 may be disposed inclined downward with respect to the horizontal plane in the direction of movement of the inner body 20. The blade 31 mounted on the rotating plate 32 is also disposed parallel to the rotating plate 32 and is inclined downward with respect to the horizontal plane.

The lawn mower robot may include a communication module (not shown). The communication module may communicate with an aerial image capture unit (not shown) and a server (not shown), which will be described later. Details will be described later.

FIG. 3 is a diagram illustrating a relationship in a system including a lawn mower robot according to an embodiment.

Referring to FIG. 3, the lawn mower robot 1 according to the embodiment may communicate with an anchor A and a simulator S.

The anchor A may be installed at a specific location within a task target area and configured to recognize the position of the lawn mower robot.

The anchor A may communicate with the lawn mower robot. By performing triangulation using at least three anchors, the position of the lawn mower robot may be accurately derived. Like a robot vacuum cleaner, the lawn mower robot may automatically mow the lawn without a separate action of a user except the action of inputting start or start and end. The position of the lawn mower robot needs to be accurately derived in order to perform the task smoothly. Accordingly, a device capable of identifying position information, such as the anchor, may be required.

Specifically, the anchor A may radiates a signal, and the lawn mower robot may be provided with a receiver (not shown) to receive the signal transmitted from the anchor A. Thus, the lawn mower robot may receive distance information from the anchor and information about a shadow area indicating a point where the signal disappears.

The simulator S may be provided inside the lawn mower robot 1. However, embodiments are not limited thereto, and the simulator may be provided as an external computer or terminal as shown in the figure.

The simulator S may recommend the optimal installation location for the anchor A based on the input information as will be described later. Also, the simulator S may have a display panel. Accordingly, the location of the anchor A may be visually recommended to the user.

The simulator S may receive map-related information from an external server or web W. For example, an actual map, such as a map captured as aerial images such as Google Maps, may be received as an input. Accordingly, it may be arranged to overlap the map formed by driving of the lawn mower robot and provided to the user.

Also, the simulator S may be configured to correct errors in the map obtained by driving of the lawn mower robot according to a user's input.

There is no limitation on the type or form of the simulator S.

That is, the simulator S may be embedded in the lawn mower robot, or may be configured separately from the lawn mower robot and provided in the form of a system including the lawn mower robot.

FIG. 4 illustrates a control method for the lawn mower robot according to the embodiment.

The control method for the lawn mower robot according to the embodiment may include operations of boundary setting driving S1, shadow area determination S2, driving ending S3, information transmission S4, obstacle map generation S5, screen output S6, and anchor recommendation S7.

The boundary setting driving S1 may be an operation of the driving the lawn mower robot to check and set the boundary of a task target area M where the lawn mower robot is to mow the lawn.

The task target area M refers to an area where lawn mowing is to be performed. Anchors A may be installed in the task target area M.

Specifically, the anchor A may be positioned on the boundary of the task target area M. Thereby, the lawn mower robot may check the boundary of the task target area M. The lawn mower robot 1 may drive by sequentially tracking the anchors A.

At least three anchors A may be provided in the task target area M. This may be intended to derive an accurate location of the lawn mower robot 1.

While it is illustrated in FIGS. 5 and 6 that four anchors A are provided, embodiments are not limited thereto. The number of anchors A may depend on various parameters such as the performance of the anchors A and the size of the task target area M.

However, it may be desired that three or more anchors are provided. This may be intended to derive the location of the lawn mower robot through triangulation.

In the boundary setting driving S1, the lawn mower robot may generate a task target area map representing the task target area by sequentially tracking multiple anchors.

The lawn mower robot may not only rectilinearly move from one anchor to another, but also determine the presence or absence of grass to travel along the boundary. Therefore, the task target area does not need to be provided in a rectangular or similar shape as shown in the accompanying drawings.

In the shadow area determination S2, the lawn mower robot 1 may receive a signal transmitted from the anchors A and drive during the boundary setting driving S1. The lawn mower robot is configured to continuously receive signals from the anchors A, and accordingly an area where a signal is temporarily not received may be determined as a shadow area.

Each anchor A may perform the shadow area determination individually. Since the multiple anchors A are installed at different locations, different shadow areas may be determined by the anchors A.

The anchors A may be arranged such that shadow areas are minimized in the task target area M. Therefore, the shadow area determination may be individually performed by each anchor A.

The anchors A may not simply determine the shadow area, but also collect various kinds of driving information. The driving information may include the distance between the lawn mower robot and each anchor, a signal strength, and coordinates in the task target area.

The driving ending S3 may be an operation of ending the driving of the lawn mower robot 1 returning to an initial location and storing the above-described driving information. When the lawn mower robot completes its first driving, the operation of the lawn mower robot may be terminated because the lawn mower robot does not need to be operated multiple times.

When the first driving of the lawn mower robot is completed, the information transmission S4 may be performed in which the driving information and information about the shadow area and task target area received by the lawn mower robot are transmitted to the simulator S.

Once the above information is transmitted to the simulator S, the obstacle map generation S5 may be performed. The obstacle map generating S5 may be an operation of generating an obstacle map by the simulator S to recommend a position for the anchor A based on the input information. In other words, the simulator S may generate an obstacle map based on the shadow area of each anchor A.

In the obstacle map generation S5, not all parts determined as shadow areas by each anchor are recognized as areas where obstacles are present.

Specifically, the shadow area determination is performed by each of the multiple anchors, and accordingly multiple shadow areas may be generated. The simulator S may classify an area where three or more shadow areas overlap among the multiple shadow areas as an obstacle area.

In addition, an area where two or more shadow areas overlap may be classified as a communication shadow area in which communication is not performed smoothly.

That is, the simulator S may determine an area where three or more shadow areas overlap among the three shadow areas and display obstacles on the map showing the task target area M. That is, an obstacle map may be generated.

Accordingly, the user may identify the positions of the obstacles in the task target area without inputting the obstacles one by one.

Once the obstacle map is generated, the screen output S6 may be performed in which the simulator S outputs the map provided from the external server or the web W and the obstacle map on the screen in an overlapping manner.

Through the screen output S6, the map (obstacle map) of the task target area reflecting the positions of the obstacles and the actual map may be compared and visually provided to the user.

When the obstacle map and the map provided from the outside are visually provided to the user in an overlapping manner, the user may correctly determine the area where actual obstacles are located.

In addition, the user may compare the obstacle map with the actual map to modify the locations and sizes of obstacles on the obstacle map generated by the simulator S. When the externally provided map and the obstacle map are arranged to overlap, the user may easily compare the obstacle map with the externally provided map to accurately determine the locations, sizes and shapes of the obstacles.

If the shape of the obstacle is not modified when the shape of the actual obstacle is different from the obstacle area formed on the obstacle map, efficiency of the lawn mowing performed by the lawn mower robot moving around the task target area may not be good.

Specifically, as an example, lawn mowing may not be performed even in an area where no obstacle is located. As a result, the user may need to perform the task again and thus experience inconvenience.

Accordingly, by providing the map provided from the outside and the obstacle map to the user such that the maps overlap each other and allowing the obstacle map to be modified, the user convenience may be enhanced.

Specifically, in the screen output S6, the user may select whether the overlapped portion of the multiple shadow areas is a communication shadow area where communication interruption occurs, or an obstacle area, and may modify the size or location thereof.

The anchor recommendation S7 may be an operation of recommending to the user a location where the size of the identified shadow area may be minimized.

As described above, a plurality of anchors A may be installed in the task target area. The number of anchors A to be installed may be set to cover the entire task target area. However, the number of anchors A provided may not be sufficient to cover the entire task target area.

The simulator S may determine a location for the anchor where the size of the shadow area within the task target area M is minimized in consideration of the task target area M and the coverage of the anchor A. Therefore, the user may change the installation position of the previously installed anchor A.

As described above, when anchor recommendation S7 is skipped, the user is required to specify the location for the anchor A in a trial and error manner. That is, after readjusting the position of the anchor A, the shadow area should be determined again through the boundary setting driving S1, and the user should directly determine the location for the anchor through comparison . Therefore, through the anchor recommendation S7, the user may easily identify the optimal anchor installation location.

FIG. 5 illustrates the boundary setting driving and shadow area determination included in the control method for the system including the lawn mower robot according to the embodiment.

Specifically, FIG. 5-*a* is a diagram illustrating that the lawn mower robot travels on the boundary of a task target area, and FIG. 5-*b* is a diagram illustrating that the lawn mower robot receives signals and information from respective installed anchors. FIG. 5-*c* is a diagram showing a shadow area.

Referring to FIGS. 5-*a* to 5-*c*, three or more anchors may be installed as described above. While it is illustrated in the figures that four anchors are provided, embodiments are not limited thereto.

Referring to the embodiment shown in FIG. 5, the lawn mower robot may sequentially track the anchors A1, A2, A3, and A4 and determine the task target area M. Once the task target area M is determined, the lawn mower robot may obtain a task target area map on which the positions of the anchors A1, A2, A3, and A4 are specified.

In addition, through the boundary setting driving, the lawn mower robot may drive and receive driving information from the respective anchors. However, as shown in the drawing, a shadow area Z in which communication fails may be created due to an obstacle area O.

The shadow area Z may include an area where communication is interrupted by obstacles and an area where communication is not smoothly performed.

A different shadow area Z may be recognized by each of the anchors A1, A2, A3, and A4. This may be because the relative positions of the anchors with respect to the obstacle are different.

The shadow area Z may include a communication shadow area and an obstacle area O. The obstacle area is an area where an actual obstacle is located, and the communication shadow area may be an area where an actual obstacle is not located, but communication is not smoothly performed due to the obstacle.

FIG. 6 illustrates the obstacle map generation included in the control method for the system including the lawn mower according to the embodiment.

FIG. 6-*a* is a diagram showing a shadow area in a task target area, and FIG. 6-*b* is a diagram illustrating determining an obstacle area based on shadow areas collected from respective anchors.

When the lawn mower robot completes its initial driving, driving information collected by each anchor may be stored. The stored information may be transmitted to the simulator S.

The simulator S may identify the obstacle area O based on the information collected from each anchor.

In the following description of the figure, the anchors will be distinguished by numbers. However, it should be noted that the interpretation is not limited to the numbers described below, and that the numbers may be interpreted differently according to standards or individual situation.

Specifically, as an example, a first anchor A1 may have a first shadow area Z1 due to an obstacle area, and a second anchor A2 may have a second shadow area Z2 due to the obstacle area. A third anchor A3 may have a third shadow area Z3 due to the obstacle area, and a fourth anchor A4 may have a fourth shadow area Z4 due to the obstacle area.

The simulator S may identify the obstacle area based on the information about the respective shadow areas.

Specifically, an area where two or more of the multiple shadow areas collected from the anchors overlap each other may be classified as a communication shadow area, and an area where three or more of the multiple shadow areas overlap each other may be classified as the obstacle area. Thus, an area where an actual obstacle is located may be displayed on the task target area M.

Accordingly, according to the present embodiment, the size and location of the task target area and the location of obstacles within the task target area may be identified through the initial driving of the lawn mower robot.

In addition, through the screen output S6, the simulator S may provide the above-described information to the user on the screen. Specifically, the simulator S may arrange the map generated by driving of the lawn mower robot and the map provided from the outside to overlap each other, and visually provide the same to the user.

In addition, in providing the maps, the simulator S may allow the user to modify the map generated by the driving of the lawn mower robot.

As shown in the figure, an actual obstacle area O may be different from an obstacle area O1 identified based on the information collected by the anchors. Accordingly, the screen output S6 may be an operation of providing the user with an opportunity to modify the map to identify the correct location and size of the obstacle.

FIG. 7 illustrates recommendation of anchor installation locations included in the control method for the system including the lawn mower robot according to the embodiment.

In the following description with reference to FIG. 7, each anchor is identified by a number as described above. However, embodiments are not limited to what is shown in the figure.

Hereinafter, a method for recommending, for example, installation locations of anchors will be described with reference to FIGS. 7-a and 7-b.

A reference anchor AS may be selected before the installation locations of the anchors are recommended. The reference anchor AS may be selected from among an anchor having the largest coverage area within the task target area, an anchor having a limited installation space, and an anchor arbitrarily selected by the user.

Once the reference anchor AS is selected, the area overlapping with the coverage area of the reference anchor AS may be maintained to have a predetermined size or more, and the installation location of the first anchor A1 may be recommended at a position having the largest coverage area within the task target area. When the installation location of the first anchor A1 is determined, the installation location of the second anchor A2 may be recommended to include an area overlapping the reference anchor AS and the first anchor A1.

The location of the second anchor A2 may include an area overlapping the reference anchor AS and the first anchor AS and may be recommended at a position where the coverage area covered within the task target area M is maximized.

That is, in general terms, when the reference anchor AS is selected, the area overlapping the coverage area of the reference anchor AS may be maintained to have a predetermined size or more, and the installation location of the n-th anchor may be recommended at a position having the largest coverage area within the task target area. Once the installation location of the n-th anchor is determined, the installation location of the n+1-th anchor may be recommended to include an area overlapping the reference anchor and the n-th anchor, where n is natural number greater than or equal to 1.

In addition, when the number of anchors is determined as shown in FIG. 7-b, installation locations of the anchors may be repeatedly determined by the method described above.

Specifically, once the locations of the reference anchor AS, the first anchor A1, and the second anchor A2 are determined, the first anchor A2 may be used as a reference anchor to recommend installation locations of the third anchor A3, the fourth anchor A4, and the like.

In general terms, once the installation locations of the reference anchor, the n-th anchor, and the n+1-th anchor are selected, the n-th anchor may be used as a reference to recommend the installation location of the n+2-th anchor.

Thus, even when a plurality of anchors is provided, the anchors may be effectively arranged within the task target area M.

In addition, as shown in FIG. 7-b, even when a predetermined number of anchors are disposed, there may be a portion that is be covered by the predetermined number of anchors within the task target area.

Since the aforementioned issue is not caused by an obstacle, it may adversely affect the work efficiency of the lawn mower robot. Accordingly, in this case, the simulator S may recommend that the user install additional anchors.

The installation location of a new anchor may be recommended at a location overlapping with the coverage areas of two anchors among the existing anchors. In addition, the installation location of the new anchor may be recommended in an area that overlaps the coverage areas of the two anchors and where the coverage area of the three anchors formed due to the new anchor is maximized.

However, in the case where the coverage area according to the installation location of the newly added anchor is not formed such that the coverage areas of three or more anchors overlap according to the shape of the task target area and the number of anchors, the installation location of the newly added anchor may be selected as an area where the coverage areas of two or more anchors overlap as much as possible.

In the case where it is difficult to provide the coverage area of the new anchor such that the coverage areas of two or more anchors overlap each other, the new anchor may be provided to cover as much range as possible within the task target area.

As described above, installation locations of existing anchors may be recommended to the user. Installation of additional anchors may also be recommended when necessary.

FIG. 8 illustrates a control method for a system including a lawn mower robot according to another embodiment Hereinafter, a method of recognizing the locations of the installed anchors and recommending that the user change the installation locations of the anchors, when necessary, will be described.

As shown in FIG. 8, there may be a case where coverage areas of four or more anchors overlap each other. In order to accurately determine the location of the lawn mower robot, it may be desirable that the coverage areas overlap as many as possible. However, the location of the lawn mower robot may be specified with only three anchors.

Therefore, when anchors are installed such that four or more coverage areas overlap, the simulator S may recommend that the user move one of the anchors to cover a wider range within the task target area M or install the same in a more desirable location.

Specifically, when four or more coverage areas of the anchors overlap, four anchors may be extracted among the anchors as a candidate group. Then, the coverage areas of the remaining anchors in the candidate group excluding one anchor may be compared on the map. Selecting and moving one anchor making the coverage areas of the remaining anchors maximized may be recommended.

In addition, a new installation location may be recommended for the one selected anchor on the boundary of the task target area M. In this case, the installation location of the new anchor may be recommended in a zone having the widest area of three or more parts overlapping the coverage areas of the remaining anchors.

In this case, an anchor having the smallest coverage area within the task target area may be selected as the one anchor.

Referring to FIG. 8 as an example, in FIG. 8-a, the first anchor A1 has a coverage area overlapping those of the second anchor A2, the third anchor A3, and the fourth anchor A4. Accordingly, the simulator S may recommend changing the installation location of the first anchor A1. Of course, changing the installation location of the second anchor A2 may be recommended.

In this case, the anchor whose installation location is recommended for change may be determined by comparing the coverage areas within the task target area. In the case where there are anchors having the same or similar coverage areas, changing the location of an anchor that has the smallest influence according to the change may be recommended. In the case where anchors have similar influences according to the change, an anchor having a smaller coverage in the task target area may be selected.

In this way, the lawn mower robot may efficiently receive information about an area to be mowed despite the movement of the anchor.

Referring to FIG. 8-a, when the first anchor A1 is moved to a place where the fifth anchor A5 and the sixth anchor A6 are located, the first anchor A1 and the fifth anchor A5 and the sixth anchor A6 may have an overlapping coverage area.

As shown in FIG. 8-b, when the first anchor A1 is moved to the place where the fifth anchor A5 and the sixth anchor A6 are located, the size of a portion where three or more coverage areas overlap within the mowing area may be increased.

Accordingly, the real-time location of the lawn mower robot may be more effectively identified.

Although representative embodiments of the present disclosure have been described in detail above, it will be apparent to those skilled in the art that various modifications and variations may be made in the present disclosure without departing from the spirit or scope of the disclosure. Thus, it is intended that the present disclosure cover the modifications and variations of this disclosure provided they come within the scope of the appended claims and their equivalents.

The invention claimed is:

1. A method of controlling a system including a lawn mower robot, the method comprising:
   boundary setting driving of driving the lawn mower robot to set a boundary of a task target area having at least three anchors installed on the boundary, the boundary setting driving comprising:
   shadow area determination of receiving, by the lawn mower robot, signals from the anchors and determining an area where the signals are disconnected as a shadow area;
   driving ending of ending the boundary setting driving and storing driving information received from the anchors when the lawn mower robot returns to an initial position;

information transmission of transmitting the driving information and information about the shadow area and the task target area to a simulator;
   obstacle map generation of generating, by the simulator, an obstacle map based on the shadow area of each of the anchors;
   screen output of overlapping a map provided from an external server or web and the obstacle map and outputting the maps to a screen;
   anchor recommendation of recommending to a user a location for minimizing a size of the determined shadow area in the task target area;
   based on four or more coverage areas of the anchors overlap each other, extracting four anchors among the anchors as a candidate group, and comparing, on the map, the coverage areas of the remaining anchors in the candidate group excluding one anchor; and
   selecting and moving one anchor making the coverage areas of the remaining anchors maximized.

2. The method of claim 1, wherein the boundary setting driving comprises:
   sequentially tracking the anchors and generating a map of the task target area.

3. The method of claim 1, wherein the driving information comprises:
   a distance between the lawn mower robot and each of the anchors;
   strengths of the signals received from the anchors; and coordinates.

4. The method of claim 1, wherein the shadow area determination comprises:
   individually setting the shadow area at each of the anchors.

5. The method of claim 1, the obstacle map generation comprises:
   classifying an area having two or more overlapping ones of a plurality of shadow areas as a communication shadow area and an area having three or more overlapping ones of the shadow areas as an obstacle area.

6. The method of claim 5, wherein the screen output comprises:
   providing the shadow areas to a user and allowing the user to select the obstacle area or the communication shadow area among the shadow areas based on the map provided from the external server or web and the obstacle map.

7. The method of claim 1, wherein the anchor recommendation comprises:
   taking one of the anchors as a reference anchor and recommending installation locations of the other anchors to the user based on the reference anchor.

8. The method of claim 7, wherein the reference anchor is selected as one of an anchor having a largest coverage area within the task target area, an anchor having a limited installation space, and an anchor arbitrarily selected by the user.

9. The method of claim 8, wherein, based on the reference anchor being selected, an area overlapping a coverage area of the reference anchor is maintained to be greater than or equal to a predetermined size, and an installation location of an n-th anchor is recommended at a position having a largest coverage area within the task target area,
   wherein, based on the installation location of the n-th anchor being determined, an installation location of an n+1-th anchor is recommended to include an area overlapping the reference anchor and the n-th anchor, where n is a natural number greater than or equal to 1.

10. The method of claim 9, wherein the installation location of the n+1-th anchor is recommended as a position including the area overlapping the reference anchor and the n-th anchor, wherein a coverage area within the task target area is maximized at the position.

11. The method of claim 9, wherein, based on the installation locations of the reference anchor and the n-th anchor being selected, an installation location of the n+2-th anchor is recommended based on the n-th anchor set as a reference.

12. The method of claim 11, based on installation locations of all the anchors being determined, installing an additional anchor is recommended so as to cover an area not covered by the installation locations of the anchors in the task target area.

13. The method of claim 1, wherein a new installation location for the one anchor is recommended on a boundary of the task target area, wherein the new installation location is recommended in a zone having a widest area of three or more parts overlapping the coverage areas of the remaining anchors.

14. The method of claim 1, wherein an anchor having a smallest coverage area within the task target area is selected as the one anchor.

* * * * *